Patented Sept. 13, 1938

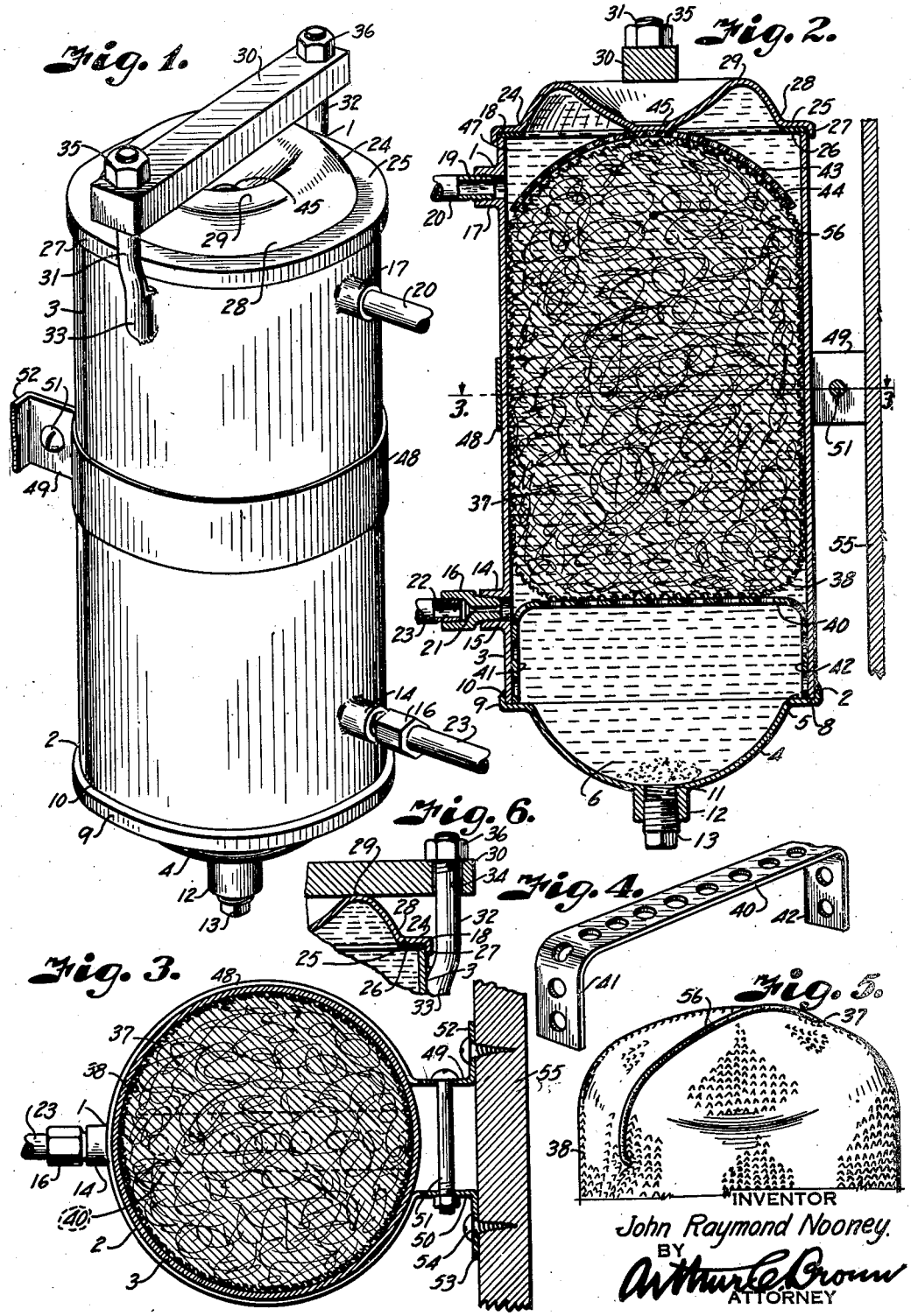

2,130,287

UNITED STATES PATENT OFFICE 2,130,287

FILTER

John Raymond Nooney, Kansas City, Mo., assignor to Economy Oil Filter Company, Kansas City, Mo., a corporation of Missouri Application August 10, 1936, Serial No. 95,129

2 Claims. (Cl. 210—131)

This invention relates to filters, particularly to those for clarifying lubricating oil used in lubricant circulating systems of internal combustion engines, and has for its principal object to provide a filter of this character having a large filtering capacity that adapts its use in high pressure and large volumetric lubricating systems.

Other important objects of the invention are to provide a relatively simple and inexpensive filter construction capable of withstanding high pressures without leakage; to provide a filtering unit that may be readily removed and replaced when necessary; and to provide a fluid-tight closure construction which may be removed and reapplied to effect a tight seal without danger of springing the parts out of shape when the closure is tightened thereby assuring a tight seal throughout the entire life of the filter.

It is also an important object of the present invention to provide an improved supporting means for retaining the filtering cartridge in a selected position within the shell of the filter.

In accomplishing these and other objects of the invention, as hereinafter pointed out, I have provided improved details of structure, the preferred form of which is illustrated in the accompanying drawing, wherein:

Fig. 1 is a perspective view of a filter constructed in accordance with the present invention.

Fig. 2 is a vertical section through the filter.

Fig. 3 is a cross-section on the line 3—3 of Fig. 2.

Fig. 4 is a detail perspective view of the lower support for the filter cartridge.

Fig. 5 is a detail perspective view of the upper end of the filter cartridge.

Fig. 6 is a detail section through the upper end of the filter, particularly illustrating the method of retaining the removable closure.

Referring more in detail to the drawing:

1 designates a filter constructed in accordance with the present invention and which includes a shell 2 preferably of cylindrical construction and formed of relatively heavy gauge material. The shell 2 includes an annular wall 3 enclosed at its lower end by a concavo-convex bottom 4. The bottom 4 is preferably formed from sheet material and has an annular shoulder 5 extending circumferentially of a basin-like sump 6 of slightly smaller diameter than the inner diameter of the wall 3. The shoulder 5 seats against the end 8 of the wall 3, as well as the legs of the lower cartridge support later described.

The periphery of the shoulders has a laterally extending annular flange 9 sleevingly engaged with the end of the wall 3 and welded thereto as indicated at 10 to form a fluid-tight joint. Provided in the bottom of the sump is a drain port 11 formed in a depending exterior boss 12, as best shown in Fig. 2, the port 11 being internally threaded to accommodate a threaded drain plug 13.

Formed on the side wall at a point above the sump is a laterally extending collar 14 having an internally threaded inlet port 15 to mount an inlet fitting 16. The upper end of the shell is likewise provided with a similar collar 17 at a point spaced below the upper edge 18 thereof and having an internally threaded outlet port 19 to connect a pipe 20 leading to the lubricant circulating system of an internal combustion engine. The fitting 16 has an inlet orifice 21 of substantially smaller diameter than the outlet port 19 to control the pressure of the oil in the filter. The fitting 16 includes an internally threaded socket 22 for connecting a pipe 23 which is also connected with the oil circulating system, preferably on the discharge side of the circulating pump (not shown).

The upper end of the shell is closed by a removable cover 24 so constructed as to withstand liquid pressures without distortion which ordinarily tend to cause the filter to leak after the cover has been removed and reapplied. The cover 24 is also preferably stamped from relatively heavy sheet material and includes an annular shoulder portion 25 to seat a gasket ring 26 sealingly engageable with the upper edge 18 of the wall 3. In order to center the cover on the cylindrical wall the periphery thereof is provided with an annular flange 27 that sleeves over the wall 3 as best shown in Fig. 3. The central portion of the cover is stamped outwardly at a point spaced inwardly from the periphery thereof, as at 28, and then downwardly in a rounded curve, as at 29, to the plane of the annular shoulder 25 thereby providing an annular rib or boss of concavo-convex cross-section projecting above the annular shoulder and having substantial rigidity to retain the shape of the cover.

The annular rib thus forms an outer, annular, apical proportion providing diametrically spaced contact points for engagement by a clamping bar 30 that extends diametrically across the annular rib and is secured by clamping posts 31 and 32 consisting of rods having their lower ends extending outwardly and upwardly to clear the flange 27 of the cover as best shown in Fig. 1. The posts or studs 31 and 32 are located at opposite diametrical points on the shell. The upper ends of the posts are of sufficient length to extend through suitable openings 34 in the ends of the bar and have threaded terminals to mount nuts 35 and 36 whereby the bar is drawn into clamping contact with the annular, apical portion of the cover plate which in turn sealingly presses the gasket against the edge 18 of the shell to provide a liquid-tight seal.

The bar 30 is of substantially heavy construction so as to amply withstand the pressure applied by the nuts 35 and 36, as well as the internal pressures within the filter. Attention is directed to the fact that the bar 30 engages the cover plate at spaced points between the center thereof and the shoulder flange so as to reduce the effective length of leverage as applied on the bar.

The filter cartridge 37 is formed of a knitted bag 38 containing a filter material, such as cotton waste, that is closely packed therein to retain the bag in extended condition, the bag being of cylindrical shape to closely engage the inner face of the cylindrical wall 3, and has a relatively flat lower end and a substantially hemispherical upper end as best shown in Fig. 2. The lower end of the bag is normally supported above the inlet port by means of a cross bar 40 having depending leg portions 41 and 42 seated against the annular shoulders 5 of the bottom 4, the legs being of sufficient length so that the bar portion thereof extends substantially in the axial plane of the inlet port. The bar 40 preferably is of narrow width, it being only wide enough to provide sufficient support for the cartridge. The support is preferably provided with a series of perforations so as to not materially interfere with the effective area of the filtering element. The spherical upper end of the cartridge is seated against a concavo-convex supporting plate 43 having a plurality of perforations 44 to allow for passage of oil after it flows through the filter. The plate 43 is fixed to the central depending portion 45 of the cover as by spot welding or the like, so that it is removed and applied with the cover. The plate 43 holds the cartridge against pressure of the oil admitted at the lower end of the filter and supports it in spaced relation with the cover plate to provide a flow chamber 47 wherefrom oil may flow freely to the outlet pipe 20.

A filter constructed as described may be mounted by any suitable bracket, for example a band 48 encircling the wall 3 and having its ends 49 and 50 secured by a clamping bolt 51. The clamping ends of the band terminate in lateral ears 52 and 53 having apertures 54 through which fastening devices are passed to secure the filter to a suitable support, as indicated at 55.

In installing the filter, the pipe 23 is preferably connected to the discharge side of the oil pump of the circulating system so that the oil is delivered under pressure through the inlet port 15 and into the space at the bottom of the shell. The pressure forces the oil upwardly through the filtering cartridge to cause filtering out of the water and solid material which gravitates into the sump, from where it may be drawn off from time to time by removing the plug 13. After the oil is passed upwardly through the filtering cartridge and through the perforations in the upper supporting plate, the oil is in clear condition and free of water and solid matter. The pipe 20 may be returned to the oil supply or crank case of the engine with which the filter is used. After continued use the filtering material finally becomes clogged with material that interferes with passage of the oil. When this occurs the cover plate may be removed by unscrewing the nuts 35 and 36, removing the bar 30 and lifting the cover plate from its seat. The cartridge may then be readily withdrawn from the open end of the shell by grasping a cord 56 that has been threaded through the cartridge as shown in Fig. 5. A new filtering cartridge is then inserted, after which the cover plate is reapplied and secured by the cross bar, as above described.

From the foregoing, it is obvious that I have provided a filter construction which is capable of withstanding high pressure and which is so constructed that the cover plate may be removed and reapplied to secure a tight seal throughout the life of the filter.

What I claim and desire to secure by Letters Patent is:

1. A filter including a shell having an opening at one end through which a filter cartridge is inserted into the shell and having inlet and outlet ports respectively located adjacent the ends of the shell, means in the shell for supporting a filter cartridge in spaced relation with the inlet port, a closure for said opening having an annular shoulder portion engaging the end of the shell and having an upwardly extending annular boss of concavo-convex cross-section and encircling a central depressed portion to form an inner annular chamber in communication with the outlet port and an outer, annular, apical portion projecting above said annular shoulder portion, a concavo-convex cartridge retaining member engaging the upper end of the cartridge and having its apical portion engaged with the central depressed portion of the closure member to retain said cartridge below the outlet port and to cooperate with said annular chamber to provide free flow of liquid from the cartridge to said outlet port, a clamping bar engaging said apical portion on diametrical sides of said depressed portion, and means for securing the ends of the clamping bar to the shell to retain said closure.

2. A filter including a shell having an opening at one end and through which a filter cartridge is inserted in the shell and having inlet and outlet ports respectively located adjacent the ends of the shell, a closure for said opening having an annular shoulder portion engaging the open end of the shell and having an upwardly extending annular boss of concavo-convex cross-section and encircling a central depressed portion to form an annular chamber in communication with the outlet port and an outer, annular, apical portion projecting above said annular shoulder portion, a bar extending across the closure and engaging against opposite diametrical points of said apical portion in bridging relation with said depressed portion, said bar having openings in the ends thereof, threaded studs fixed at the sides of the shell and extending upwardly through the openings in the ends of the bar, and nuts on the studs clampingly engaging the ends of the bar for securing the closure.

JOHN RAYMOND NOONEY.